(12) United States Patent
Goodgame et al.

(10) Patent No.: US 7,042,974 B2
(45) Date of Patent: May 9, 2006

(54) METHOD FOR RECONSTRUCTING TOMOGRAPHIC IMAGES

(75) Inventors: Marvin M. Goodgame, Ontario, NY (US); Shoupu Chen, Rochester, NY (US); Nathan D. Cahill, West Henrietta, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 70 days.

(21) Appl. No.: 10/850,490

(22) Filed: May 20, 2004

(65) Prior Publication Data

US 2005/0259780 A1    Nov. 24, 2005

(51) Int. Cl.
*A61B 6/03*    (2006.01)

(52) U.S. Cl. .......................... 378/4; 378/901

(58) Field of Classification Search .............. 378/4, 378/8, 15, 901
See application file for complete search history.

(56) References Cited

U.S. PATENT DOCUMENTS

| 4,888,693 | A |  | 12/1989 | Tam ...................... 364/413.16 |
| 5,053,958 | A |  | 10/1991 | Tam ...................... 364/413.13 |
| 6,285,732 | B1 |  | 9/2001 | Hsieh ............................. 378/4 |
| 6,907,102 | B1 | * | 6/2005 | Sauer et al. .................. 378/19 |
| 2005/0135664 | A1 | * | 6/2005 | Kaufhold et al. ........... 382/131 |

OTHER PUBLICATIONS

"Tomographical imaging with limited-angle input" by K.C. Tam and V. Perez-Mendez. J. Opt. Soc. Am., vol. 71, No. 5, May 1981, pp. 582-592.

* cited by examiner

*Primary Examiner*—David V Bruce
(74) *Attorney, Agent, or Firm*—Stephen H. Shaw

(57) ABSTRACT

A method for reconstructing computerized tomographic (CT) images of an object, including: scanning the object with a CT imaging system to acquire views that include measured projections of the object. Additionally, the method applies an iterative algorithm to minimize errors between the measured projections and reprojections of a reconstructed CT image, wherein at each iteration, projection errors become smaller causing the reconstructed CT image to become further refined.

15 Claims, 4 Drawing Sheets

METHOD FOR RECONSTRUCTING TOMOGRAPHIC IMAGES

FIELD OF THE INVENTION

The present invention relates to a digital image processing method for tomographic imaging. Specifically, the present invention relates to methods for reconstructing an underdetermined image from incomplete data.

BACKGROUND OF THE INVENTION

In at least one conventional computed tomography (CT) imaging system configuration, an x-ray source projects a fan-shaped beam, which is collimated to lie within an X-Y plane of a Cartesian coordinate system and generally referred to as the "imaging plane". The x-ray beam passes through a medical patient or other imaging object. The x-ray beam, after being attenuated by the object, impinges upon an array of radiation detectors. The intensity of the attenuated x-ray beam radiation received at the detector array is dependent upon the attenuation of the x-ray beam passing through the imaging object, such as the medical patient's body. Each detector element of the array produces a separate electrical signal that is a measurement of the x-ray beam's attenuation at the detector location. Separate attenuation measurements from all the detectors are acquired to produce a transmission profile.

In conventional third generation CT systems, the x-ray source and the detector array are rotated with a gantry within the imaging plane and around an imaging object so that the angle at which the x-ray beam intersects the imaging object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two-dimensional slice taken through the object. One method for reconstructing an image from a set of projection data is referred to in the art as the filtered backprojection technique. This process converts the attenuation measurements from a scan into integers called "CT numbers" or "Hounsfield units", which are used to control the brightness of a corresponding pixel on a cathode ray tube display.

At least one known CT imaging system is available that combines a gantry rotation rate of 0.8 s with a data acquisition system (DAS) sampling rate of 1230 Hz. As a result, a projection sampling rate of 984 views per gantry rotation is obtained. Theoretical, experimental, and clinical investigations have shown that, from a standpoint of aliasing, this sampling rate is near a lower limit. It is desirable to increase the scan rate to at least 0.5 s per gantry rotation to reduce motion artifacts and to reduce imaging times, but to do so would require a higher sampling rate. Hardware limitations limit maximum sampling rates, however. For example, hardware and software limitations may limit a DAS sampling rate to 1408 Hz. For 0.5 s per scan, 704 views per gantry rotation would be obtained in such a system, yielding a 28.5% reduction in the number of available views, and hence data, as compared to other CT imaging systems that provide 984 views per gantry rotation. If proper compensation is not performed, view aliasing artifacts, such as streaks, will result in reconstructed images. Radiologists object to such aliasing artifacts. In sum, when the number of views acquired per gantry rotation is too low, insufficient data results, thereby, causing objectionable image artifacts.

U.S. Pat. No. 6,285,732, issued to Hsieh on Sep. 4, 2001, and incorporated herein by reference, teaches methods and apparatus for reducing aliasing artifacts in computerized tomographic imaging using adaptive, non-uniform view interpolation within a selected view range. Additionally, in U.S. Pat. No. 6,285,732, Hsieh teaches a method of weighting the views to compensate for the non-uniform interpolation, and filtering and backprojecting the views to generate an image of the imaging object that he says reduces view aliasing artifacts "without clinically unacceptable reduction in spatial resolution."

In practice, because view interpolation inherently results in some reduction in spatial resolution, it remains desirable to provide a method and a system for CT imaging that reduces view aliasing artifacts, without employing view interpolation and its inherent limitations.

SUMMARY OF THE INVENTION

The above need is met, according to the present invention, by providing a method for reconstructing computerized tomographic (CT) images of an object, includes scanning the object with a CT imaging system to acquire views that include measured projections of the object. Additionally, an iterative algorithm is applied to minimize errors between the measured projections and reprojections of a reconstructed CT image. At each iteration, projection errors become smaller, causing the reconstructed CT image to become further refined.

Another aspect of the invention provides a system for reconstructing computerized tomographic images, that includes:

a) means for acquiring a measured projection signal of a computerized tomographic image;

b) an iterative filter for processing the measured projections subsequent to a predetermined delay and yielding a reprojected reconstruction signal;

c) means for acquiring an initial reprojected reconstruction signal of a computerized tomographic image;

d) a time delay for delaying implementation of the initial reprojected reconstruction signal as an input to the iterative filter subject to the predetermined delay;

e) a switch for controlling the implementation of the initial reprojected reconstruction signal as an input to the iterative filter; and f) a summation for comparing the measured projection signal with the reprojected reconstruction signal to yield projection errors that will provide feedback for altering the iterative filter in subsequent operations of the iterative signal estimation system.

ADVANTAGES

Improved CT imaging is thus provided, in this embodiment, by reducing view aliasing artifacts without reducing spatial resolution, typically attributed to view interpolation.

DETAILED DESCRIPTION OF THE INVENTION

Figure 1A:
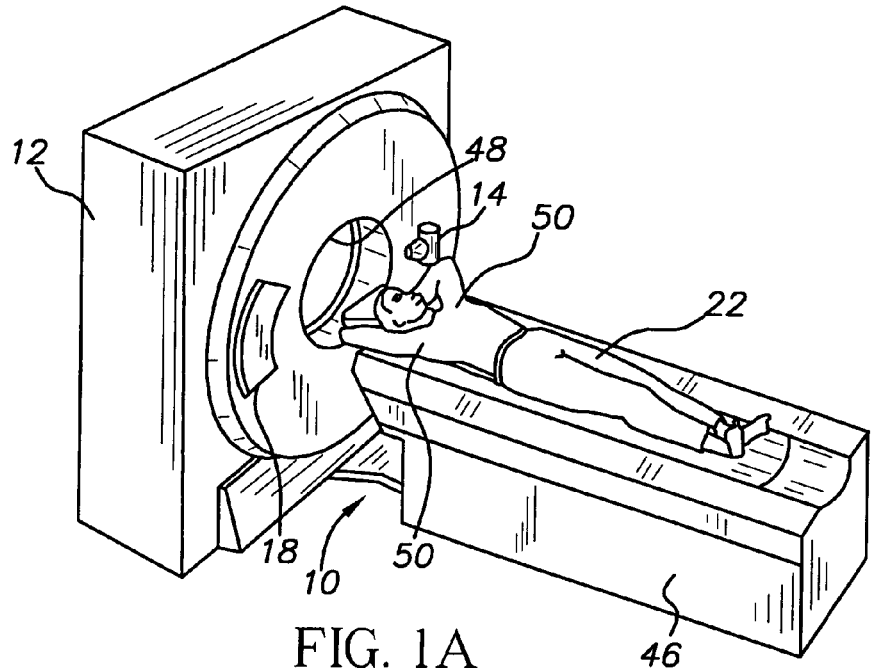
FIG. 1A is a prior art pictorial view of a CT imaging system.
Figure 1B:
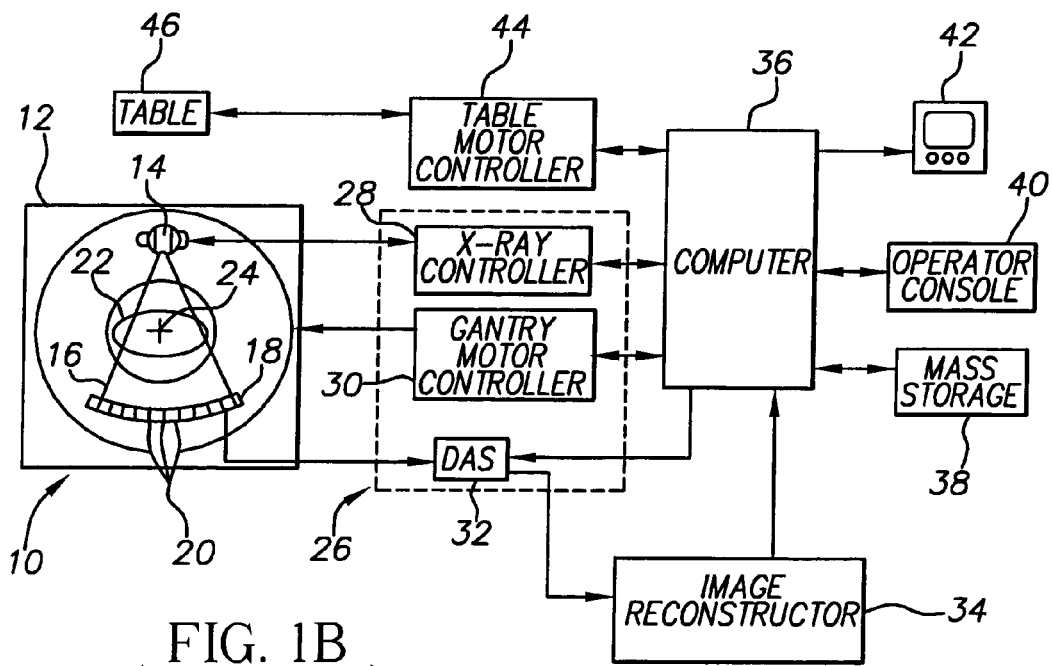
FIG. 1B is a prior art block diagram of the system illustrated in FIG. 1A.

Referring to FIGS. 1A and 1B, a prior art computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20, which together sense the projected x-rays that pass through an object 22, for example, a medical patient. Detector array 18 may be fabricated as either a single slice or multi-slice configuration. Each detector element 20 produces an electrical signal (not shown) that represents the intensity of an impinging x-ray beam 16, and hence the attenuation of the x-ray beam 16 as it passes through patient 22. Gantry 12 and the components mounted thereon, rotate about a center of rotation 24, during a scan to acquire x-ray projection data.

A control mechanism 26 of CT system 10 governs rotation of gantry 12 and the operation of x-ray source 14. The control mechanism 26 includes an x-ray controller 28 that provides power and timing signals to x-ray source 14 and a gantry motor controller 30 that controls the rotational speed and position of gantry 12. A data acquisition system (DAS) 32, in control mechanism 26, samples analog data from detector elements 20 and converts the data to digital signals for subsequent processing. An image reconstructor 34 receives sampled and digitized x-ray data from DAS 32 and performs high-speed image reconstruction. The reconstructed image is provided as an input to a computer 36, which stores the image in a mass storage device 38.

Computer 36 also receives commands and scanning parameters from an operator via console 40, that has a keyboard (not shown). An associated cathode ray tube display 42 allows the operator to observe the reconstructed image and other data from computer 36. The operator-supplied commands and parameters are used by computer 36 to provide control signals and information to DAS 32, x-ray controller 28 and gantry motor controller 30. In addition, computer 36 operates a table motor controller 44, which controls a motorized table 46 to position patient 22 in gantry 12. Particularly, table 46 moves portions of patient 22 through gantry opening 48.

A majority of clinical aliasing artifacts occur in prior art CT system 10 when a dense object is located near an outer region of a field of view, because the view requirement is roughly proportional to the distance of an object from the CT isocenter. For example, shoulder bones 50 of patient 22 often produce aliasing streaks. The digital image processing method of the present invention reduces these artifacts while maintaining optimal spatial resolution. In fact, when the filtered backprojection technique employs a smoothing filter such a Hamming window, the present invention can yield an actual enhancement of spatial resolution.

Thus, in one embodiment of the present invention, an object 22, for example, a medical patient, is scanned with CT imaging system 10 to acquire views comprising projection samples of the object 22. These views are further processed by image reconstructor 34 into images that are stored by computer 36 in storage device 38 for viewing on CRT display 42. (Because design choices are available in which distributed processing of images in various CT imaging systems 10 is performed, it will be understood that the invention is not limited to embodiments in which all processing is performed by a discrete image reconstructor 34).

The present invention reduces artifacts due to inadequate view sampling. Signal to noise ratio of the acquired views is assumed to be adequate. One way to address such artifacts would be to double the number of views by interpolation, but this approach leads to a reconstruction with significantly reduced spatial resolution. Previously cited U.S. Pat. No. 6,285,732 teaches a nonuniform view interpolation method that provides a good compromise between aliasing artifact reduction and reduction of spatial resolution. The present invention avoids view interpolation entirely and therefore does not compromise spatial resolution.

The present invention is also applicable to a limited-angle tomographic reconstruction problem in which views can be measured only in a limited angular range. An iterative algorithm for limited-angle image reconstruction that is related to the present invention is reported by K. C. Tam and V. Perez-Mendez in J. Opt. Soc. Am., 71 (1981) 582–592. Said algorithm is also discussed by K. C. Tam as prior art in U.S. Pat. No. 5,053,958. This prior art iterative algorithm, shown here in FIG. 2, uses measured projections and a priori information on the object to estimate missing projections. Both measured projections and estimated missing projections are used in image reconstruction. In contrast to the prior art, the iterative algorithm of the present invention, as shown in FIG. 3, uses the measured projections and a priori information for image reconstruction.

Figure 2:
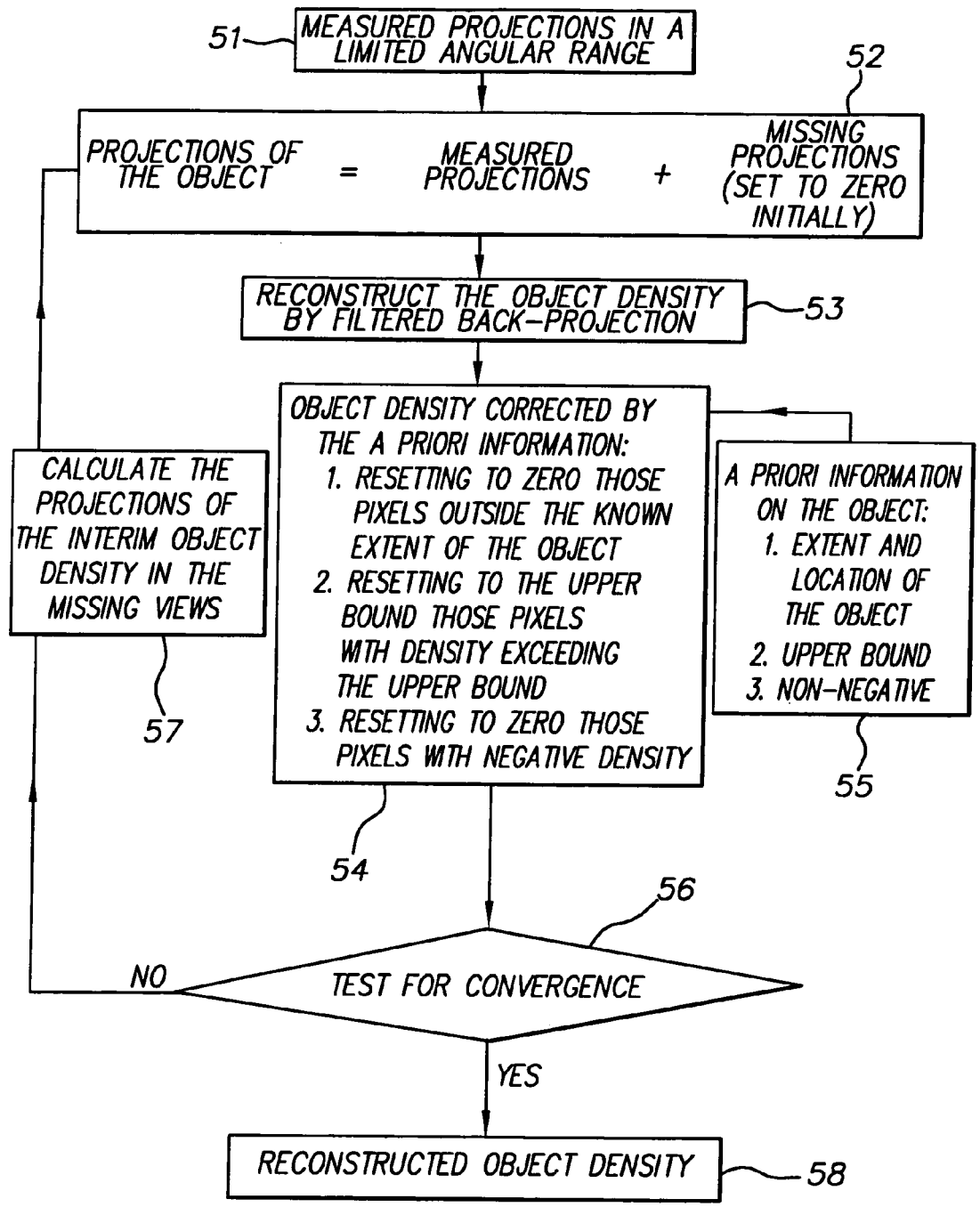
FIG. 2 is a prior art flowchart of an iterative algorithm to reconstruct an object from limited-angle data.
Figure 3:
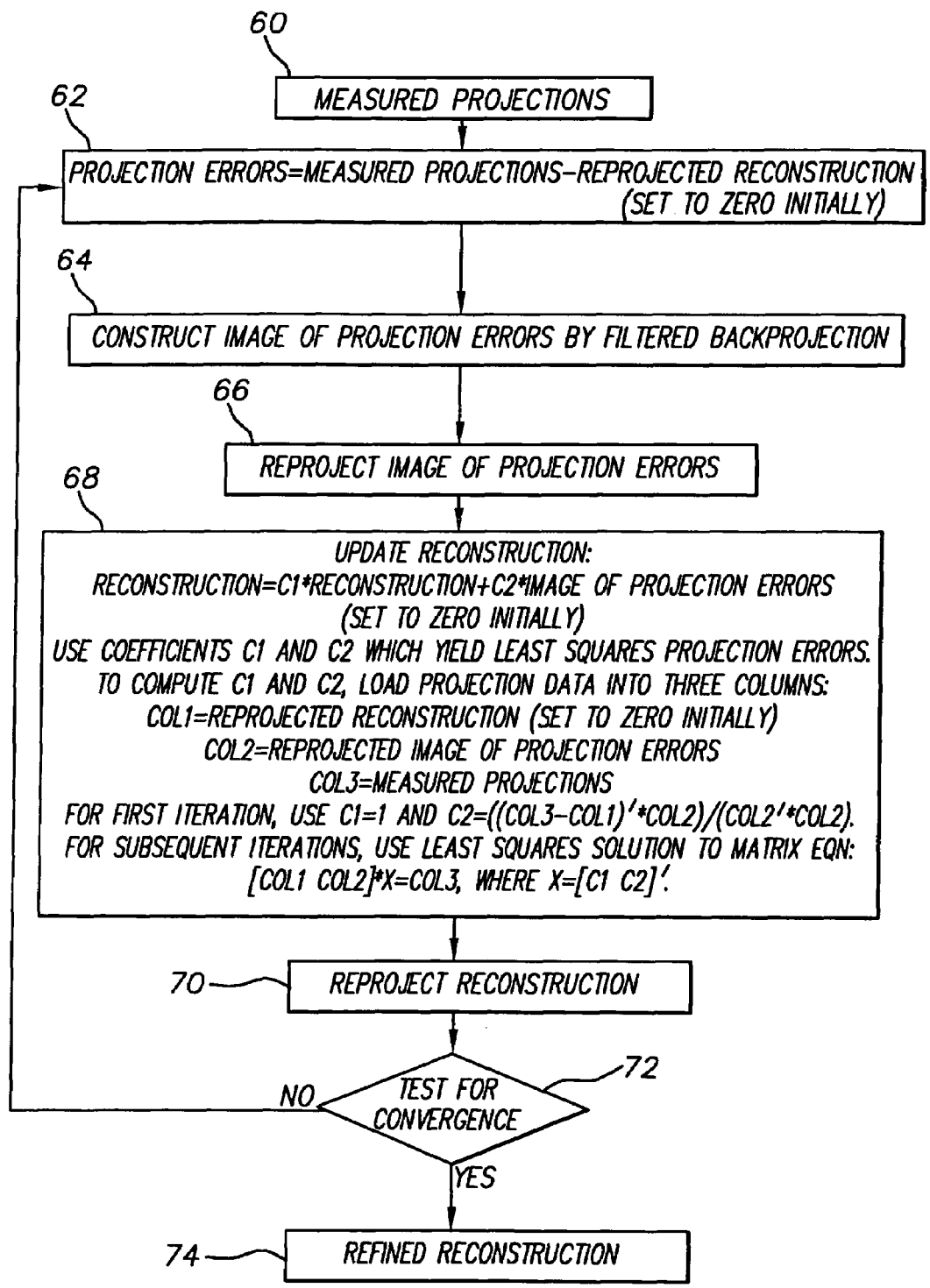
FIG. 3 is an exemplary block diagram of the digital image processing method according to the present invention.

The advantage of the algorithm in FIG. 3 versus FIG. 2 is that the reconstruction of the present invention is driven toward consistency with the measured projections, whereas the reconstruction of the prior art is not. Consistency of the prior art reconstruction depends on the accuracy of the filtered backprojection technique, whereas consistency of the reconstruction of the present invention can be achieved even with an approximate backprojection technique. For this reason, when the filtered backprojection technique employs a smoothing filter such as a Hamming window, the reconstruction from the algorithm in FIG. 2 will be blurred, but the reconstruction from the algorithm in FIG. 3 will not.

The algorithm in FIG. 2 will now be described in greater detail. Referring to steps 51–53, the measured projections in a limited angular range are acquired. A complete set of projections of the object is comprised of these measured projections plus the missing projections at inaccessible view angles, which are set to zero initially. The object density is reconstructed by filtered backprojection. The initial estimate of object density, steps 54 and 55, is corrected by the a priori information on the object, namely the extent and location of the object, the known upper bound of object density, and that there is no negative density. The image of the object is corrected, pixel by pixel, by resetting to zero those pixels outside the known extent of the object, resetting to the upper bound those pixels with density exceeding the upper bound, and resetting to zero those pixels with negative density. After a test for convergence of the data is made, steps 56 and 57, the missing projections of the interim object density in the missing views are calculated.

A second iteration begins and the first estimate of the missing projections are now provided as well as the measured projections. A filtered backprojection operation is done on the whole set of projections in order to reconstruct the object. The object density is corrected by the a priori information, the second estimate of the missing projections is calculated, and so on. Typically the reconstructed image of the object converges after about 5 to 10 iterations and a final reconstructed object density or reconstructed image, step 58, is output.

The iterative method of the present invention will now be described. Referring to FIG. 3, measured projections 60 have been corrected for various well known errors such as variations in detector and channel gains, and are log adjusted, by taking the negative logarithm of the corrected data. The measured projections 60, therefore, indicate the amount of attenuating material along the path of each detected x-ray beam. When these measured projections 60 are incomplete (e.g., limited view sampling or limited-angle acquisition), then an image constructed by filtered backprojection includes aliasing artifacts. The present invention's iterative process, shown in FIG. 3, reduces these aliasing artifacts while driving a reconstructed image 74 toward consistency with the measured projections 60.

Thus, in one embodiment of the present invention depicted in FIG. 3, there is provided an iterative method for refining a reconstructed image 74 from the measured projections 60, each iteration of the method including the operations of calculating projection errors 62; constructing an image of projection errors 64; reprojecting the image of projection errors 66; updating the reconstruction 68; reprojecting the reconstruction 70; and testing for convergence 72.

Figure 4A:
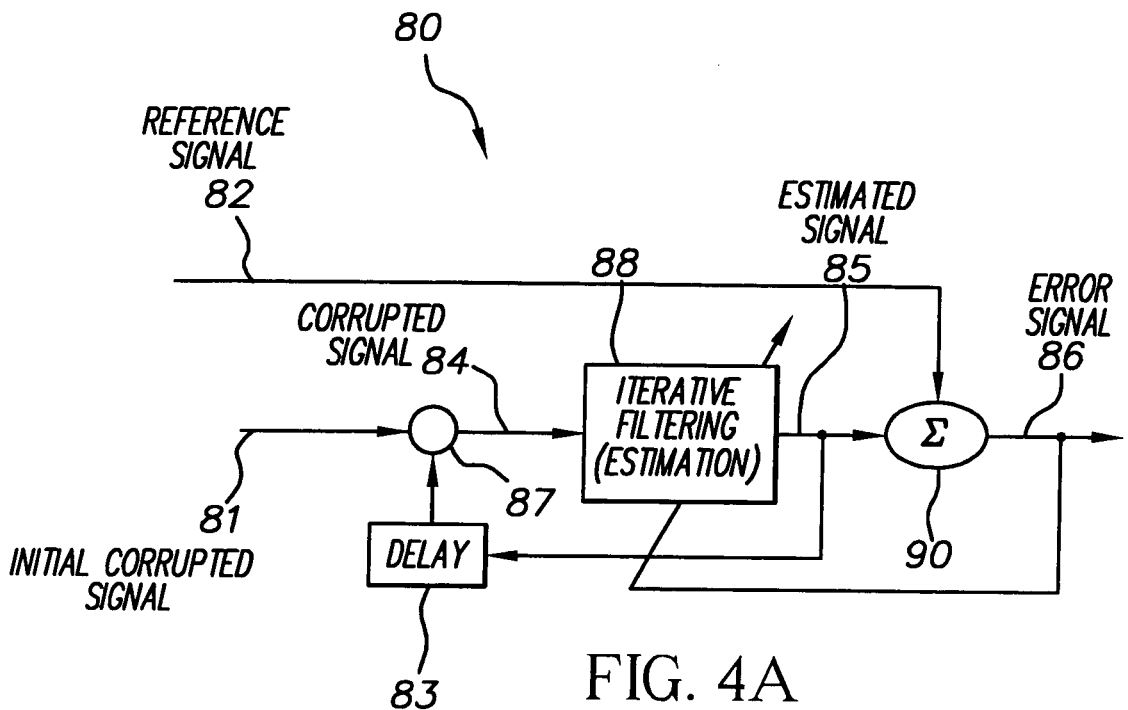
FIG. 4A is a general signal estimation system that models the method of the present invention.

From a signal processing point of view, the method of the present invention can be modeled as a general signal estimation system, as shown in FIG. 4A. Referring to FIG. 4A, a reference signal 82 and a corrupted signal 84 are given to a signal estimation system 80 that attempts to remove noise from the corrupted signal 84 through iterative filtering 88. An estimated signal 85 output from the iterative filtering 88 is compared in step 90 with the reference signal 82, resulting in an error signal 86. The error signal 86 is used as feedback information to alter the filtering mechanism in iterative filtering 88 in order to drive the estimated signal 85 toward the reference signal 82. In the context of tomographic image reconstruction, the reference signal 82 corresponds to the measured projections 60 (shown in FIG. 3), the error signal 86 corresponds to the projection errors 62 (shown in FIG. 3), and the estimated signal 85 corresponds to the reprojected reconstruction 70 (shown in FIG. 3). When the iterative process starts, corrupted signal 84 is an initial corrupted signal 81, which could be zero. After a first iteration of filtering, a switch 87 connects the corrupted signal 84 to the estimated signal 85 through a delay 83, such that the current corrupted signal 84 is the estimated signal 85 from the previous iteration.

Figure 4B:
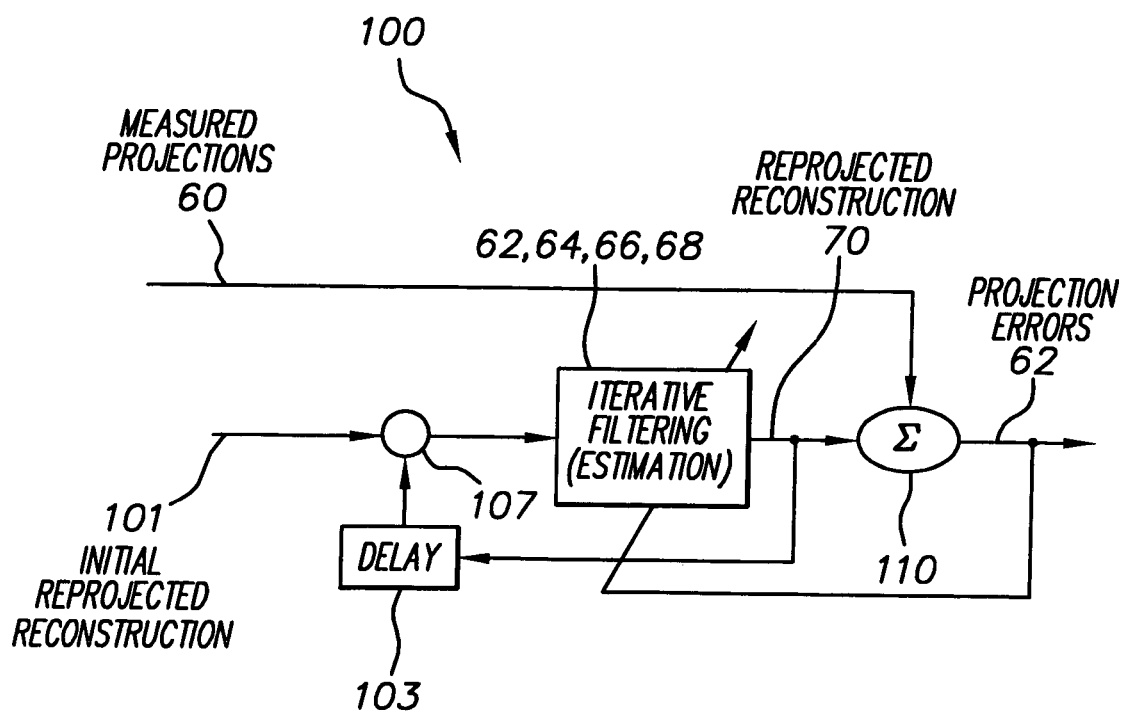
FIG. 4B is a diagram illustrating the present invention in a signal estimation framework.

FIG. 4B depicts the method of the present invention within the framework of a signal estimation system 100, but with tomographic image reconstruction descriptors. Part numbers less than 100 in FIG. 4B correspond to identical part numbers shown in FIG. 3. As shown in FIG. 4B, the measured projections 60 and the reprojected reconstruction 70 (through a delay 103 and a switch 107) are given to an iterative filtering process including operations (62, 64, 66, 68 (all shown in FIG. 3)) that attempts to remove error from the reprojected reconstruction 70. The reprojected reconstruction 70 output from the iterative filtering process including operations (62, 64, 66, 68 (all shown in FIG. 3)) is compared in step 110 with the measured projections 60, resulting in the projection errors 62. The projection errors 62 are used as feedback information to alter the filtering mechanism in the iterative filtering process including operations (62, 64, 66, 68 (all shown in FIG. 3)) in order to drive the reprojected reconstruction 70 toward the measured projections 60. For the first iteration of the process, an initial reprojected reconstruction 101, which could be zero, is used instead of the delayed reprojected reconstruction 70. Operational details of the iterative process are given next.

Before the iterative process begins, it is useful to define an image mask of the object. In a preferred embodiment, the mask is constructed using measured data, such as from a separate optical scan of the object. If no separate measurements are made, however, then the mask can be constructed from the measured x-ray projections in a process utilizing unfiltered backprojection within a loop over all views. This process includes the steps of backprojecting the unfiltered measured projections 60 for the current view; calculating the result of the comparison (pixel<=noise) for this backprojection, thereby identifying as TRUE the pixels through which x-rays pass without attenuation; and updating the mask (set initially to FALSE) by a logical OR operation with these TRUE pixels. After all views have been included, the mask is inverted by a logical NOT operation, so that pixels inside the object are TRUE, and pixels outside the object are FALSE. If a more accurate image mask is required, U.S. Pat. No. 4,888,693, assigned to General Electric Company, teaches a method to estimate the object boundary with greater accuracy by fitting curves to the edges of the projection data to more precisely determine end points between attenuated and unattenuated x-rays.

Referring again to FIG. 3, the projection errors 62 are the measured projections 60 minus the reprojected reconstruction 70 (which is initially set to zero). The image of projection errors 64 is constructed by filtered backprojection, and in the preferred embodiment, pixels outside the object are reset to zero using an image mask of the object. The reprojected image of projection errors 66 is calculated by integrating along the path of each detected x-ray beam. The reconstruction 68 is updated as a linear combination of the current reconstruction 68 (which is initially set to zero) and the image of projection errors 64 using the coefficients $c1$ and $c2$, respectively, that yield the least squares projection errors 62.

To compute coefficients $c1$ and $c2$, projection data are loaded into three columns: col1 includes the reprojected reconstruction 70 (which is initially set to zero); col2 includes the reprojected image of projection errors 66; and col3 includes the measured projections 60. For the first iteration, one can use $c1=1$ (which is arbitrary, since the reconstruction 68 is set to zero initially) and $c2=((col3-col1)'*col2)/(col2'*col2)$. In another embodiment, one could instead use $c1=1$ and $c2=1$ for the first iteration, which would yield an updated reconstruction 68 corresponding exactly to the image constructed by filtered backprojection of the measured projections. For subsequent iterations, one can use the least squares solution to the matrix equation $[col1\ col2]*x=col3$, where $x=[c1\ c2]'$. In another embodiment, one could instead use $c1=1$ (since $c1$ converges to unity) and $c2=((col3-col1)'*col2)/(col2'*col2)$.

The reprojected reconstruction 70 can be calculated by integrating along the path of each detected x-ray beam. In the preferred embodiment, however, to save computer time, the reprojected reconstruction 70 is calculated as a linear combination of the current reprojected reconstruction 70 (which is set to zero initially) and the reprojected image of projection errors 66 using the coefficients $c1$ and $c2$, respectively. The test for convergence 72 is based on the root mean square of projection errors 62. Upon convergence, the refined reconstructed image 74 is obtained.

Comparing FIGS. 2 and 3, it would seem logical to take from FIG. 2 steps 54 and 55 (in which the object density is corrected by the a priori information on the object), and insert these steps into FIG. 3 between steps 68 and 70. The updated reconstruction 68 would then be subjected to three corrections: (1) resetting to zero those pixels outside the known extent of the object; (2) resetting to the upper bound those pixels with density exceeding the upper bound; and (3) resetting to zero those pixels with negative density. Correction (1) can have no effect, because pixels outside the object are already zero for the preferred embodiment in which an image mask of the object is applied to the image of projection errors 64. Correction (2) and (3) can result in small improvements to the refined reconstruction 74; however, including either of these corrections in the present invention prevents the use of the preferred method of computing the reprojected reconstruction 70 by linear combination. The reprojected reconstruction 70 must instead be calculated by integration, which takes more computer time. Moreover, including either of these two corrections in the present invention can sometimes lead to non-monotonic convergence of the root mean square of projection errors 62. The test for convergence 72 must then allow for non-monotonic behavior without stopping prematurely. Thus, to save computer time and to ensure monotonic convergence, the preferred embodiment of the present invention does not make a priori corrections to the updated reconstruction 68.

From the preceding description of various embodiments of the present invention, it is clearly evident that one or more methods, apparatuses, and systems incorporating the present invention provide improved CT imaging by reducing view aliasing artifacts while maintaining optimal spatial resolution by driving the reconstructed image toward consistency with the measured projections.

Although particular embodiments of the invention have been described and illustrated in detail, it is also clearly understood that the same is intended by way of illustration and example only and is not in any way solely limited to these disclosed illustrations and examples. In addition, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used if individual detector elements are corrected to provide substantially uniform responses to a given x-ray beam. Moreover, the system described herein performs an axial scan; however, the invention may also be used with a helical scan. Accordingly, the spirit and scope of the invention are to be limited only by the terms of the appended claims and their legal equivalents.

PARTS LIST

10 Computed tomography (CT) imaging system
12 Gantry representative of a "third generation" CT scanner
14 X-ray source
16 Beam of x-rays
18 Detector array
20 Detector elements
22 Object, for example a medical patient
24 Center of rotation
26 Control mechanism
28 X-ray controller
30 Gantry motor controller
32 Data acquisition system (DAS)
34 Image reconstructor
36 Computer
38 Mass storage device
40 Console
42 Cathode ray tube display
44 Table motor controller
46 Motorized table
48 Gantry opening
50 Shoulder bones
51 Measured projections
52 Complete set of projections
53 Density reconstructed by filtered backprojection
54 Density corrected by the a priori information
55 A priori information
56 Test for convergence
57 Missing projections
58 Reconstructed density
60 Measured projections
62 Projection errors
64 Image of projection errors
66 Reprojected image of projection errors
68 Updated reconstruction
70 Reprojected reconstruction
72 Test for convergence
74 Reconstructed image
80 Signal estimation system
81 Initial corrupted signal
82 Reference signal
83 Delay
84 Corrupted signal
85 Estimated signal
86 Error signal
87 Switch
88 Iterative filtering
90 Summation
100 Signal estimation system for tomographic image reconstruction
101 Initial reprojected reconstruction
103 Delay
107 Switch
110 Summation

What is claimed is:

1. A method for repetitively reconstructing computerized tomographic (CT) images of an object, comprising the steps of:
   a) scanning the object with a CT imaging system to acquire views that include measured projections of the object; and
   b) applying an iterative algorithm to minimize errors between the measured projections of the object and reprojections of a reconstructed CT image, comprising the steps of:
      b1) acquiring measured projections of a computerized tomoqraphic (CT) image;
      b2) computing projection errors from the measured projections minus computed projections of a reconstructed CT image;
      b3) constructing an image of the projection errors;
      b4) reprojecting the image of the projection errors;
      b5) updating the reconstructed CT image;
      b6) reprojecting the reconstructed CT image;
      b7) testing for convergence of the projection errors as they are minimized;
      b8) iteratively performing steps b2–b7, until the step of testing for convergence is satisfied; and
      b9) obtaining a refined and reconstructed CT image from the reconstructed CT image that had been updated.

2. The method claimed in claim 1, wherein for each iteration a filtered backprojection is used for image reconstruction.

3. The method claimed in claim 1, wherein the iterative signal estimation system employs iterative filtering.

4. The method claimed in claim 1, wherein for each iteration the reconstructed CT image is updated by a linear combination of a current reconstructed CT image and an image of its projection errors.

5. The method claimed in claim 4, wherein the linear combination is given by solving a matrix equation that yields a least squares projection error.

6. The method claimed in claim 4, wherein the linear combination is given by using a unity coefficient of the current reconstructed CT image and a coefficient of the image of projection errors to yield a least squares projection error.

7. A digital imaging processing method, comprising the steps of:
   a) acquiring measured projections of a computerized tomographic image;
   b) computing projection errors from the measured projections minus computed projections of a reconstructed image;
   c) constructing an image of the projection errors;
   d) reprojecting the image of the projection errors;
   e) updating the reconstructed image;
   f) reprojecting the reconstructed image;
   g) testing for convergence of the projection errors as they are minimized;
   h) repeating steps b-g, until the step of testing for convergence is satisfied; and
   i) obtaining a refined and reconstructed image from the reconstructed image that had been updated.

8. The digital image processing method claimed in claim 7, wherein filtered backprojection is used for image reconstruction.

9. The digital image processing method claimed in claim 7, wherein the reconstructed CT image is updated by a linear combination of a current reconstructed CT image and an image of its projection errors.

10. The digital image processing method claimed in claim 9, wherein the linear combination is given by solving a matrix equation that yields a least squares projection error.

11. The digital image processing method claimed in claim 9, wherein the linear combination is given by using a unity coefficient of the current reconstructed CT image and a coefficient of the image of projection errors to yield a least squares projection error.

12. A system for reconstructing computerized tomographic images, comprising:
   a) means for acquiring a measured projection signal of a computerized tomographic image;
   b) an iterative filter for processing the measured projections subsequent to a predetermined delay and yielding a reprojected reconstruction signal;
   c) means for acquiring an initial reprojected reconstruction signal of a computerized tomographic image;
   d) a time delay for delaying implementation of the initial reprojected reconstruction signal as an input to the iterative filter subject to the predetermined delay;
   e) a switch for controlling the implementation of the initial reprojected reconstruction signal as an input to the iterative filter; and
   f) a summation for comparing the measured projection signal with the reprojected reconstruction signal to yield projection errors that will provide feedback for altering the iterative filter in subsequent operations of the iterative signal estimation system.

13. The system claimed in claim 12, wherein the initial reprojected reconstruction signal is set at zero.

14. The system claimed in claim 14, wherein at each iteration, filtered backprojection is used for image reconstruction.

15. The system claimed in claim 14, wherein the projection errors are the measured projection signals minus the reprojected reconstruction signals that had been set initially to zero.

* * * * *

UNITED STATES PATENT AND TRADEMARK OFFICE
CERTIFICATE OF CORRECTION

| | |
|---|---|
| PATENT NO. | : 7,042,974 B2 |
| APPLICATION NO. | : 10/850490 |
| DATED | : May 9, 2006 |
| INVENTOR(S) | : Marvin M. Goodgame et al. |

Page 1 of 1

It is certified that error appears in the above-identified patent and that said Letters Patent is hereby corrected as shown below:

| | |
|---|---|
| Column 10, Claim 14, line 33 | Please replace the words "claim 14" with the words --claim 13-- |
| Column 10, Claim 15, line 36 | Please replace the words "claim 14" with the words --claim 13-- |

Signed and Sealed this

Twenty-second Day of August, 2006

JON W. DUDAS
*Director of the United States Patent and Trademark Office*